US012791326B2

(12) United States Patent
Pfau

(10) Patent No.: US 12,791,326 B2
(45) Date of Patent: Nov. 10, 2026

(54) INFORMATION PROCESSING APPARATUS, INFORMATION PROCESSING SYSTEM, AND INFORMATION PROCESSING METHOD

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 18/879,055

(22) PCT Filed: Jun. 16, 2023

(86) PCT No.: PCT/IB2023/056250
§ 371 (c)(1),
(2) Date: Dec. 26, 2024

(87) PCT Pub. No.: WO2024/003665
PCT Pub. Date: Jan. 4, 2024

(65) Prior Publication Data
US 2025/0383209 A1 Dec. 18, 2025

(30) Foreign Application Priority Data
Jun. 30, 2022 (JP) ................................. 2022-106713

(51) Int. Cl.
*G01C 21/30* (2006.01)
*B62J 45/20* (2020.01)

(52) U.S. Cl.
CPC .............. *G01C 21/30* (2013.01); *B62J 45/20* (2020.02)

(58) Field of Classification Search
None
See application file for complete search history.

(56) References Cited

U.S. PATENT DOCUMENTS 3,630,079 A * 12/1971 Hughes ...................... G01S 1/02 73/178 R
2003/0173127 A1* 9/2003 Noecker ............... B60W 30/16 180/170

(Continued)

FOREIGN PATENT DOCUMENTS

DE 112020002267 T5 1/2022
EP 4137846 A1 2/2023

(Continued)

OTHER PUBLICATIONS

International Search Report and Written Opinion for Application No. PCT/IB2023/056250 dated Sep. 22, 2023 (13 pages).

*Primary Examiner* — Daniel L Greene
(74) *Attorney, Agent, or Firm* — Michael Best & Friedrich LLP

(57) ABSTRACT

The present invention obtains an information processing apparatus, an information processing system, and an information processing method capable of appropriately specifying an absolute position of a leaning vehicle.
In an information processing apparatus (18), an information processing system (1), and an information processing method according to the invention, an acquiring section of the information processing apparatus (18) acquires surrounding environment information that is information related to an environment in a surrounding of a leaning vehicle (10) based on an output from a radar (14) mounted to the leaning vehicle (10), and a specifying section of the information processing apparatus (18) specifies an absolute position of the leaning vehicle (10) based on the surrounding environment information.

16 Claims, 5 Drawing Sheets

(56) References Cited

U.S. PATENT DOCUMENTS

| | | | |
|---|---|---|---|
| 2018/0326906 A1 | 11/2018 | Savaresi et al. | |
| 2019/0001986 A1* | 1/2019 | Horita | B60W 40/04 |
| 2020/0232801 A1 | 7/2020 | Kim et al. | |
| 2024/0140504 A1* | 5/2024 | Seidel | B61L 15/0081 |

FOREIGN PATENT DOCUMENTS

| | | |
|---|---|---|
| JP | 2009116882 A | 5/2009 |
| WO | 2021218388 A1 | 11/2021 |

* cited by examiner

[FIG. 1]
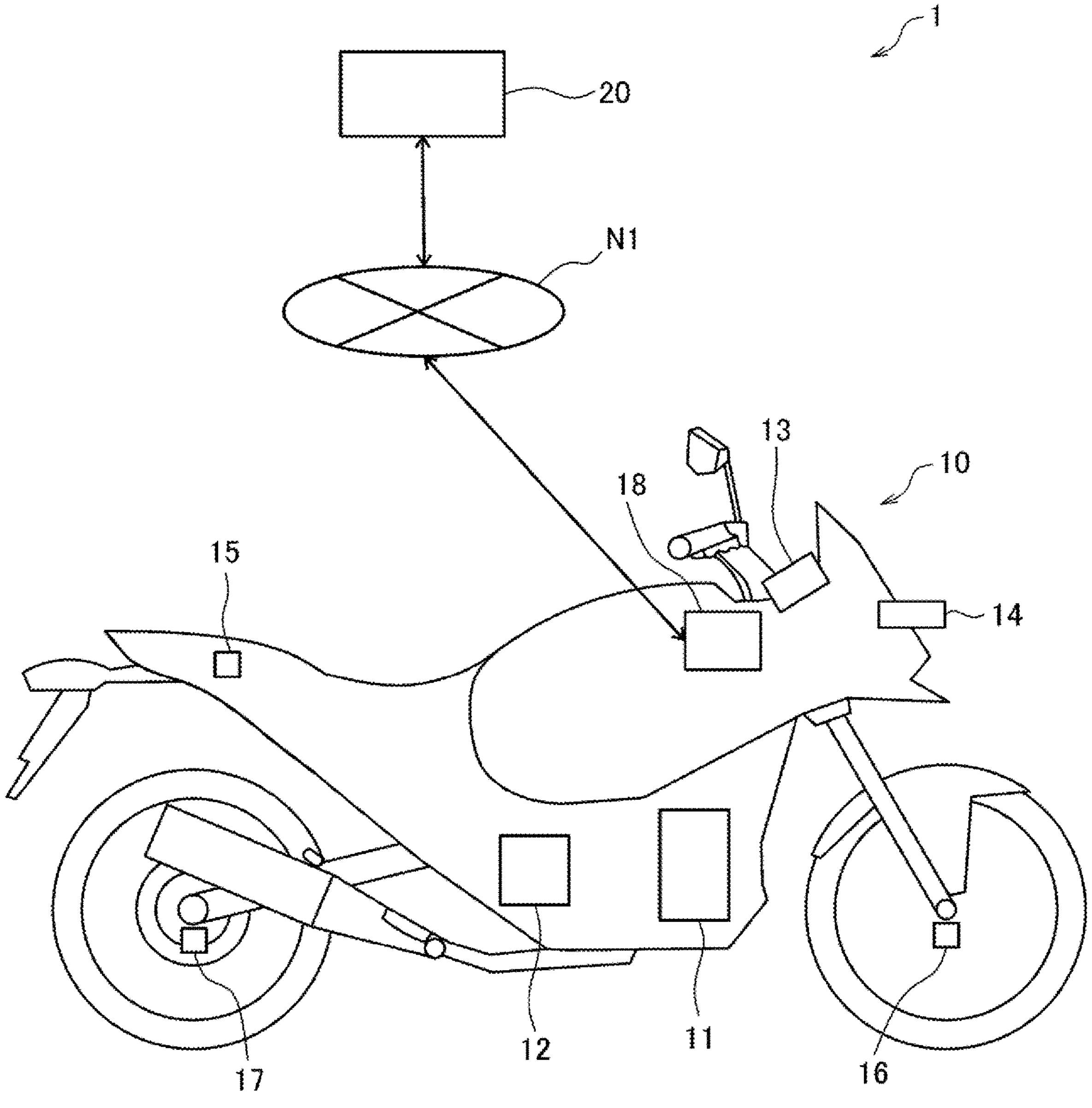

[FIG. 2]
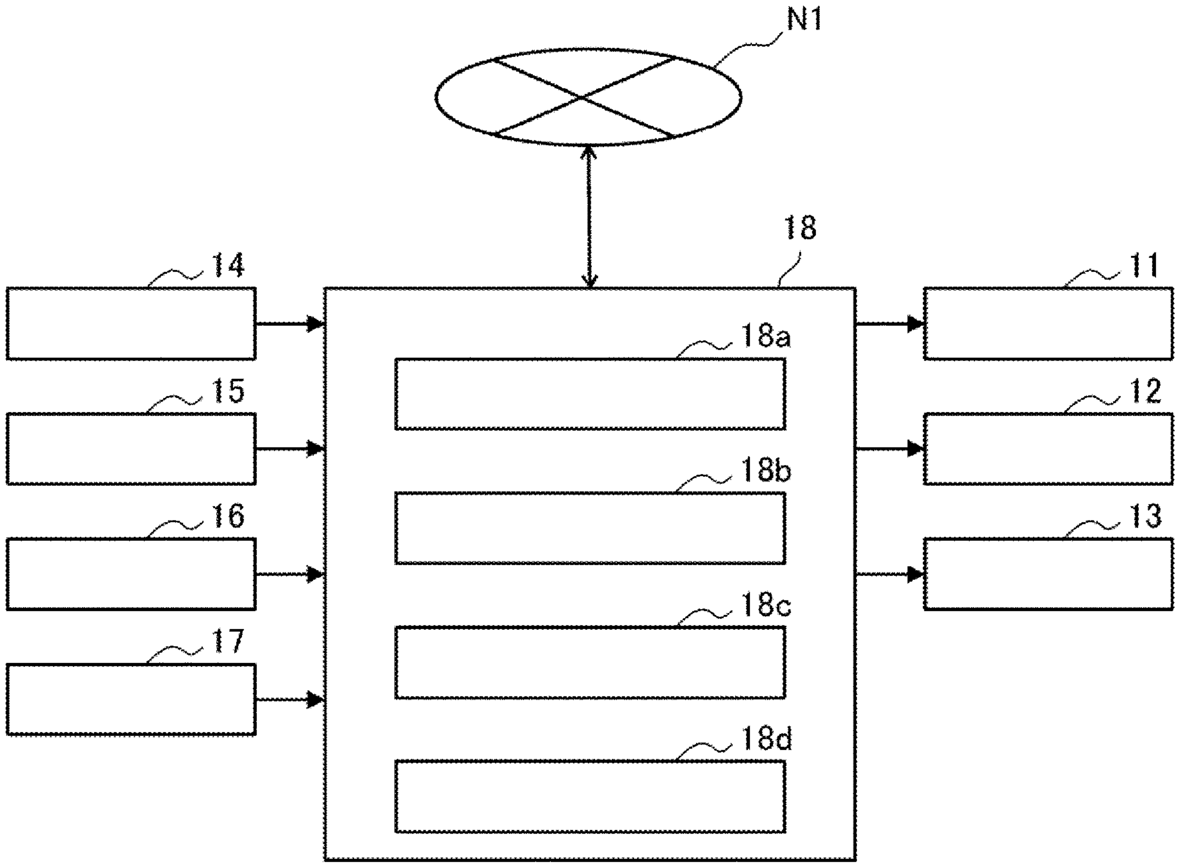

[FIG. 3]
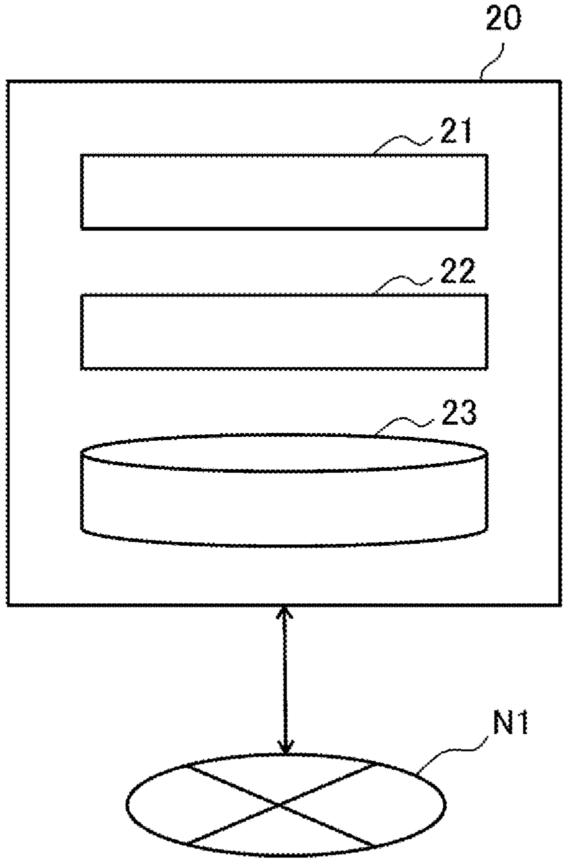
[FIG. 4]
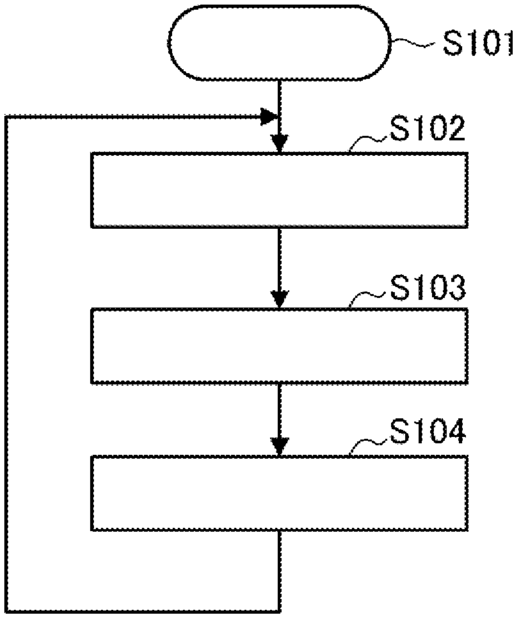

[FIG. 5]
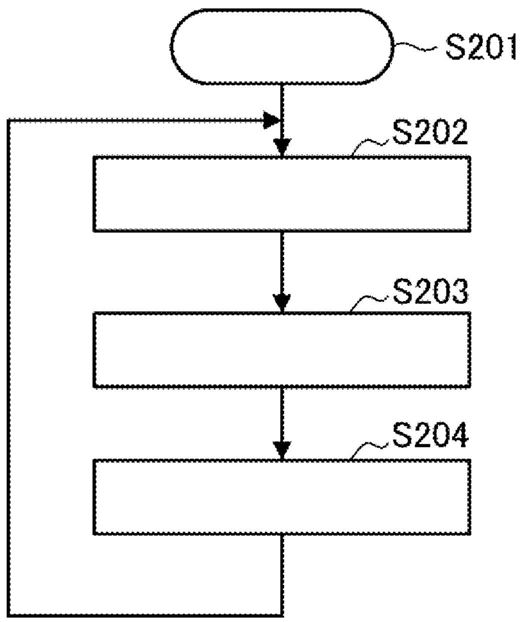
[FIG. 6]
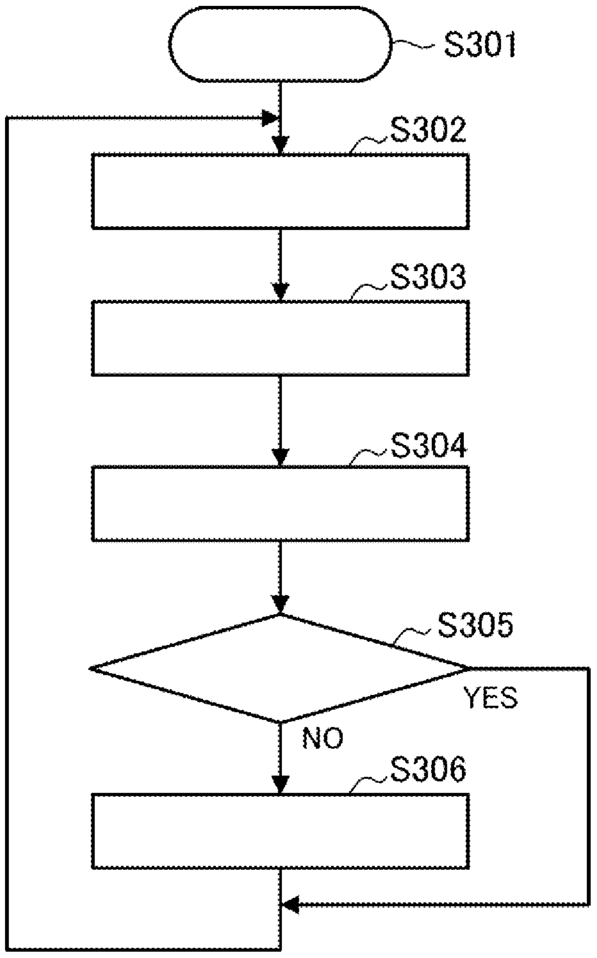

[FIG. 7]
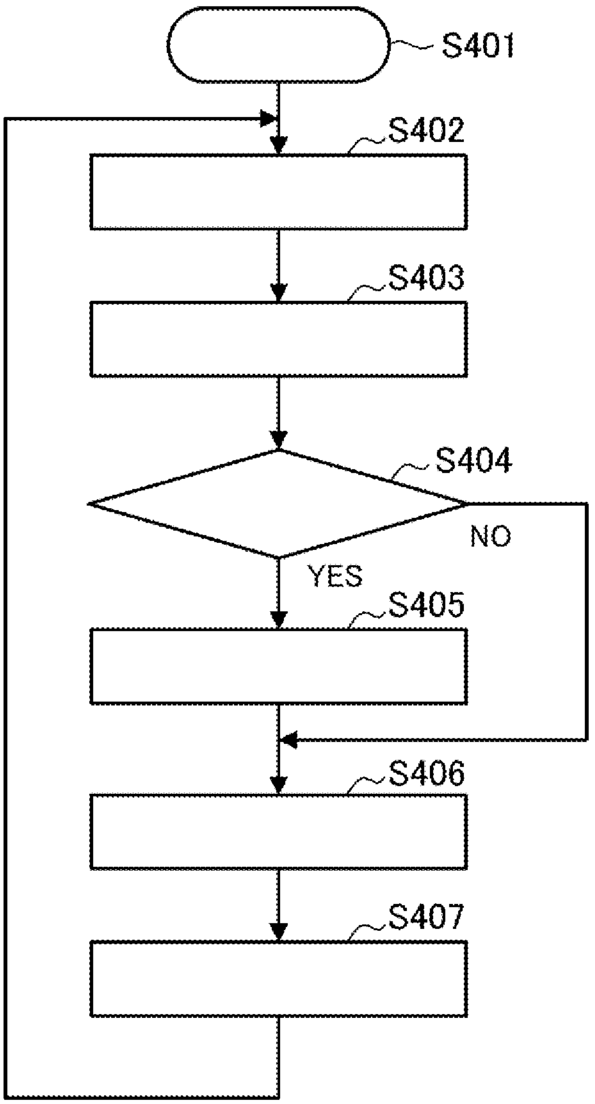

INFORMATION PROCESSING APPARATUS, INFORMATION PROCESSING SYSTEM, AND INFORMATION PROCESSING METHOD

BACKGROUND

This disclosure relates to an information processing apparatus, an information processing system, and an information processing method capable of appropriately specifying an absolute position of a leaning vehicle.

As a related art related to a leaning vehicle such as a motorcycle, there is a technique of supporting driving by a rider. For example, JP2009/116882A discloses a driver support system that warns, based on information detected by a sensor apparatus that detects an obstacle present in a traveling direction or substantially present in the traveling direction, a rider of a motorcycle about an inappropriate approach to the obstacle.

For example, the driving support control or the like that supports the driving by a rider is executed based on absolute position information that is information related to an absolute position of a leaning vehicle in some cases. Therefore, appropriately specifying the absolute position of the leaning vehicle is desired.

SUMMARY

The invention is made in view of the abovementioned problem, and obtains an information processing apparatus, an information processing system, and an information processing method capable of appropriately specify an absolute position of a leaning vehicle.

An information processing apparatus according to the invention is an information processing apparatus that performs information processing related to a position of a leaning vehicle, and is provided with: an acquiring section that acquires surrounding environment information that is information related to an environment in a surrounding of the leaning vehicle based on an output from a radar mounted to the leaning vehicle; and a specifying section that specifies an absolute position of the leaning vehicle based on the surrounding environment information.

An information processing system according to the invention is an information processing system that performs information processing related to a position of a leaning vehicle, and is provided with: an acquiring section that acquires surrounding environment information that is information related to an environment in a surrounding of the leaning vehicle based on an output from a radar mounted to the leaning vehicle; a creating section that executes map creating processing of creating or updating a map based on the surrounding environment information; and a specifying section that specifies an absolute position of the leaning vehicle based on the map.

An information processing method according to the invention is an information processing method of performing information processing related to a position of a leaning vehicle, and includes: acquiring, by an acquiring section of an information processing apparatus, surrounding environment information that is information related to an environment in a surrounding of the leaning vehicle based on an output from a radar mounted to the leaning vehicle; and specifying, by a specifying section of the information processing apparatus, an absolute position of the leaning vehicle based on the surrounding environment information.

In the information processing apparatus, the information processing system, and the information processing method according to the invention, an acquiring section of the information processing apparatus acquires surrounding environment information that is information related to an environment in a surrounding of the leaning vehicle based on an output from a radar mounted to the leaning vehicle, and a specifying section of the information processing apparatus specifies an absolute position of the leaning vehicle based on the surrounding environment information. Therefore, the surrounding environment information that is appropriately acquired based on the output from the radar is used to specify an absolute position of the leaning vehicle. Therefore, the absolute position of the leaning vehicle can be appropriately specified.

BRIEF DESCRIPTION OF DRAWINGS

FIG. 1 is a schematic diagram illustrating a schematic configuration of an information processing system according to an embodiment of the invention.

FIG. 2 is a block diagram illustrating one example of a function configuration of an information processing apparatus according to the embodiment of the invention.

FIG. 3 is a block diagram illustrating one example of a function configuration of a server according to the embodiment of the invention.

FIG. 4 is a flowchart illustrating one example of a flow of processing related to creating a map that is performed by the information processing system according to the embodiment of the invention.

FIG. 5 is a flowchart illustrating one example of a flow of processing related to using the map that is performed by the information processing system according to the embodiment of the invention.

FIG. 6 is a flowchart illustrating one example of a flow of first processing related to creating a map in which reliability information is considered, and is performed by the information processing system according to the embodiment of the invention.

FIG. 7 is a flowchart illustrating one example of a flow of second processing related to creating a map in which reliability information is considered, and is performed by the information processing system according to the embodiment of the invention.

DETAILED DESCRIPTION

Hereinafter, an information processing apparatus, an information processing system, and an information processing method according to the invention will be described with reference to the drawings.

Note that, although a case where a leaning vehicle included in the information processing system is a two-wheeled motorcycle is described in the following (see a leaning vehicle 10 in FIG. 1), the leaning vehicle included in the information processing system according to the invention may be another leaning vehicle other than the two-wheeled motorcycle. The leaning vehicle indicates a vehicle in which the vehicle body falls on the right side in turning traveling in the right direction, and the vehicle body falls on the left side in turning traveling in the left direction. The leaning vehicle includes, for example, motorcycles (a two-wheeled motor vehicle and a three-wheeled motor vehicle), and a bicycle. The motorcycle includes a vehicle that uses an engine as a power source, a vehicle that uses an electric motor as a power source, and the like. The motorcycle includes, for example, a motorbike, a scooter, and an electric scooter. The bicycle indicates a vehicle capable of traveling on a road by a pedal force of a rider that is applied to a pedal. The bicycle includes an electric assist bicycle, an electric bicycle, and the like.

Moreover, although a case where an engine (specifically, an engine 11 in FIG. 1, which is described later) is mounted as a drive source capable of outputting power for driving wheels is described in the following, another drive source (for example, electric motor) other than the engine may be mounted as a drive source, or a plurality of drive sources may be mounted.

Moreover, the configuration, the operation, and the like to be described in the following are examples, and an information processing apparatus, an information processing system, and an information processing method according to the invention are not limited to the case having such the configuration, the operation, and the like.

Moreover, the same or similar descriptions are simplified or omitted as appropriate in the following. Moreover, in the respective drawings, as for the same or similar members or portions, assigning reference numerals thereto is omitted, or the same reference numerals are assigned thereto. Moreover, detailed structures are simplified or omitted as appropriate.

Configuration of Information Processing System

With reference to FIGS. 1 and 2, a configuration of an information processing system 1 according to the embodiment of the invention will be described.

FIG. 1 is a schematic diagram illustrating a schematic configuration of the information processing system 1. As illustrated in FIG. 1, the information processing system 1 includes the leaning vehicle 10 and a server 20 that allows wireless communication with each other via a wireless communication network N1. The leaning vehicle 10 is a two-wheeled motorcycle corresponding to one example of a leaning vehicle according to the invention. Note that, one leaning vehicle 10 is illustrated in FIG. 1 for easy understanding, however, a plurality of vehicles including the leaning vehicle 10 are actually communicable with the server 20 via the communication network N1. The plurality of vehicles communicable with the server 20 include, in addition to the leaning vehicle 10, leaning vehicles other than the leaning vehicle 10, four-wheeled automobiles, and the like.

As illustrated in FIG. 1, the leaning vehicle 10 is provided with the engine 11, a hydraulic pressure control unit 12, a display apparatus 13, a radar 14, an inertial measurement apparatus (IMU) 15, a front-wheel wheel speed sensor 16, a rear-wheel wheel speed sensor 17, and an information processing apparatus (ECU) 18.

The engine 11 corresponds to one example of a drive source of the leaning vehicle 10, and is capable of outputting power for driving a wheel. For example, the engine 11 is provided with one or a plurality of cylinders in which a combustion chamber is formed in an inside thereof, a fuel injection valve that injects fuel toward the combustion chamber, and an ignition plug. The fuel is injected from the fuel injection valve to form an air-fuel mixture containing air and fuel in the combustion chamber, and the air-fuel mixture is ignited by the ignition plug and burns. Accordingly, a piston provided in the cylinder reciprocates, and a crankshaft rotates. Moreover, a throttle valve is provided in an air-intake pipe of the engine 11 to change the air-intake quantity to the combustion chamber in accordance with the opening degree of throttle that is the opening degree of the throttle valve.

The hydraulic pressure control unit 12 is a unit that has a function of controlling a braking force that is generated in the wheel. For example, the hydraulic pressure control unit 12 is provided on an oil passage that connects a master cylinder to a wheel cylinder, and includes components (for example, a control valve and a pump) for controlling a braking hydraulic pressure of the wheel cylinder. The operation of the components in the hydraulic pressure control unit 12 is controlled to control a braking force to be generated in the wheel. Note that, the hydraulic pressure control unit 12 may respectively control braking forces to be generated in both of a front wheel and a rear wheel, or may control the braking force to be generated in only one of the front wheel and the rear wheel.

The display apparatus 13 has a display function of visually displaying information. Examples of the display apparatus 13 can include a liquid crystal display or a lamp. The display apparatus 13 is provided in front of a handle in a body of the leaning vehicle 10, for example. Further, an arrangement of the display apparatus 13 with respect to the vehicle body is not specially limited.

The radar 14 detects surrounding environment information that is information related to an environment in the surrounding of the leaning vehicle 10. For example, the radar 14 is provided to a front part of the leaning vehicle 10, and detects surrounding environment information in front of the leaning vehicle 10. The surrounding environment information detected by the radar 14 is output to the information processing apparatus 18.

The surrounding environment information that is detected by the radar 14 may be information (for example, a relative position, a relative distance, a relative speed, or a relative acceleration) related to a distance to or an orientation of a subject that is positioned in the periphery of the leaning vehicle 10, or may be a feature (for example, a type of the subject, a shape of the subject itself, or a mark assigned to the subject) of the subject that is positioned in the periphery of the leaning vehicle 10.

The inertial measurement apparatus 15 is provided with a three-axis gyro sensor and a three-way acceleration sensor, and detects a posture of the leaning vehicle 10. The inertial measurement apparatus 15 is provided to the body of the leaning vehicle 10, for example. For example, the inertial measurement apparatus 15 detects a lean angle, a pitch angle, and a yaw angle of the leaning vehicle 10, and outputs detection results. The inertial measurement apparatus 15 may detect other physical amounts that can be substantially converted into the lean angle, the pitch angle, and the yaw angle of the leaning vehicle 10. The lean angle corresponds to an angle indicating an inclination of the vehicle body (specifically, body) of the leaning vehicle 10 in the roll direction with respect to the vertical upward direction. The inertial measurement apparatus 15 may be provided with parts of the three-axis gyro sensor and the three-way acceleration sensor.

The front-wheel wheel speed sensor 16 is a wheel speed sensor that detects a wheel speed of the front wheel (for example, a rotational frequency [rpm] per unit time or a movement distance [km/h] per unit time, and the like of the front wheel), and outputs a detection result. The front-wheel wheel speed sensor 16 may detect another physical amount that can be substantially converted into the wheel speed of the front wheel. The front-wheel wheel speed sensor 16 is provided to the front wheel.

the rear-wheel wheel speed sensor 17 is a wheel speed sensor that detects a wheel speed of the rear wheel (for example, a rotational frequency [rpm] per unit time or a movement distance [km/h] per unit time, and the like of the rear wheel), and outputs a detection result. The rear-wheel wheel speed sensor 17 may detect another physical amount that can be substantially converted into the wheel speed of the rear wheel. The rear-wheel wheel speed sensor 17 is provided to the rear wheel.

The information processing apparatus 18 performs various kinds of information processing. Specifically, the information processing apparatus 18 performs information processing related to a position of the leaning vehicle 10, and information processing related to control of each apparatus in the leaning vehicle 10. For example, a part or all of the information processing apparatus 18 includes a microcomputer, a microprocessor unit, and the like. Moreover, for example, a part or all of the information processing apparatus 18 may include an updatable component such as firmware, and may be a program module or the like that is executed by a command from a CPU or the like. The information processing apparatus 18 may be one information processing apparatus 18 or may be divided into a plurality of the information processing apparatuses 18, for example.

FIG. 2 is a block diagram illustrating one example of a function configuration of the information processing apparatus 18. As illustrated in FIG. 2, the information processing apparatus 18 is provided with, for example, a communicating section 18*a*, an acquiring section 18*b*, a specifying section 18*c*, and an executing section 18*d*.

The communicating section 18*a* communicates with various kinds of communication apparatuses that can communicate with the communicating section 18*a*. For example, the communicating section 18*a* communicates with the server 20 via the communication network N1. For example, the communicating section 18*a* communicates with vehicles in the periphery of the leaning vehicle 10 by vehicle-to-vehicle communication (for example, V2V). The vehicle-to-vehicle communication is executed via the communication network N1, for example. For example, the communicating section 18*a* communicates with traffic equipment in the periphery of the leaning vehicle 10 by the wireless communication (for example, V2X). For example, the V2V communication and/or the V2X communication is executed via the communication network N1. For example, the communicating section 18*a* can also communicate with a positioning system (for example, GPS: Global Positioning System).

The acquiring section 18*b* acquires information from the respective apparatuses in the leaning vehicle 10. For example, the acquiring section 18*b* acquires information from the radar 14, the inertial measurement apparatus 15, the front-wheel wheel speed sensor 16, and the rear-wheel wheel speed sensor 17. Note that, in the present description, the acquisition of information can include extraction, creation, and the like of the information. The acquiring section 18*b* may acquire information via the communicating section 18*a*, from various kinds of communication apparatuses that can wirelessly communicate with the communicating section 18*a*.

The specifying section 18*c* specifies an absolute position of the leaning vehicle 10. A specified result by the specifying section 18*c* is used for driving support control by the executing section 18*d*, for example.

The executing section 18*d* executes the driving support control. The driving support control is control of supporting the driving by a rider of the leaning vehicle 10, and can include various kinds of control. The executing section 18*d* executes the driving support control by controlling as appropriate operations of the engine 11, the hydraulic pressure control unit 12, and the display apparatus 13, for example. Note that, details of the driving support control are described later.

The server 20 in FIG. 1 collects and manages information from a plurality of vehicles including the leaning vehicle 10 and/or the road equipment, creates or updates a map that is information to be used in each vehicle for the driving support control, and transmits the map to each vehicle. For example, a part or all of the server 20 includes a microcomputer, a microprocessor unit, and the like. Moreover, for example, a part or all of the server 20 may include an updatable component such as firmware, and may be a program module or the like that is executed by a command from a CPU or the like. The server 20 may be one server 20 or may be divided into a plurality of the servers 20, for example.

FIG. 3 is a block diagram illustrating one example of a function configuration of the server 20. As illustrated in FIG. 3, the server 20 is provided with, for example, a communicating section 21, a creating section 22, and a storing section 23.

The communicating section 21 communicates with a plurality of vehicles including the leaning vehicle 10 via the communication network N1. For example, the communicating section 21 communicates with the information processing apparatus 18 in the leaning vehicle 10. For example, the communicating section 21 communicates with the road equipment via the communication network N1.

The creating section 22 executes map creating processing of creating or updating the abovementioned map based on the information collected from the plurality of vehicles. The map includes various kinds of information. For example, the map includes a data set in which huge quantities of detection point data indicating detection points detected by surrounding environment sensors in the respective vehicles are integrated. The detection point data includes, in addition to data indicating a position of each vehicle, data indicating a position of a lane boundary. Note that, details of the map are described later.

The storing section 23 stores therein various kinds of information. For example, the storing section 23 stores therein information received by the communicating section 21. The map creating processing by the creating section 22 is performed based on the information to be stored in the storing section 23. Moreover, for example, the storing section 23 stores therein the map created or updated by the creating section 22.

Operation of Information Processing System

With reference to FIGS. 4 to 7, an operation of the information processing system 1 according to the embodiment of the invention will be described.

In the information processing system 1, communication is performed between the information processing apparatus 18 in the leaning vehicle 10 and the server 20 to implement appropriately specifying an absolute position of the leaning vehicle 10. Hereinafter, among processing performed by the information processing system 1, processing related to creating a map and processing related to using the map will be described sequentially.

FIG. 4 is a flowchart illustrating one example of a flow of processing related to creating a map that is performed by the information processing system 1. S101 in FIG. 4 corresponds to a start of a processing flow illustrated in FIG. 4.

When the processing flow illustrated in FIG. 4 is started, at S102, the acquiring section 18*b* of the information processing apparatus 18 acquires surrounding environment information based on an output from the radar 14.

The surrounding environment information that is acquired at S102 includes detection point data such as detection point data indicating a position of a vehicle in the surrounding, and detection point data indicating a position of a lane boundary (for example, a median strip or a guard rail) in the surrounding.

Next to S102, at S103, the communicating section 18*a* of the information processing apparatus 18 transmits the surrounding environment information acquired at S102 to the server 20 that is an external apparatus. The communicating section 21 of the server 20 receives the transmitted surrounding environment information.

Next to S103, at S104, the creating section 22 of the server 20 executes the map creating processing based on the surrounding environment information, and the processing returns to S102.

The map that is created or updated by the map creating processing includes, as mentioned above, a data set in which huge quantities of detection point data indicating detection points detected by the surrounding environment sensors in the respective vehicles are integrated. In the map, a plurality of detection point data indicating positions of the lane boundary correspond to information indicating a road shape, for example. Moreover, in the map, a plurality of detection point data indicating positions of the respective vehicles correspond to information indicating a traffic situation, for example. Moreover, the map can include, for example, information related to a road surface gradient, a road surface state, a sign, a legal speed, and the presence or absence of an accident. In the map, these various kinds of information are integrated. At S104, for example, surrounding environment information to be acquired at S102 is added to the map stored in the storing section 23 of the server 20 to create a new map.

FIG. 5 a flowchart illustrating one example of a flow of processing related to using a map that is performed by the information processing system 1. S201 in FIG. 5 corresponds to a start of a processing flow illustrated in FIG. 5.

When the processing flow illustrated in FIG. 5 is started, at S202, the communicating section 18*a* of the information processing apparatus 18 receives a map from the server 20.

Next to S202, at S203, the specifying section 18*c* of the information processing apparatus 18 specifies an absolute position of the leaning vehicle 10 based on the map acquired at S202.

At S203, for example, the specifying section 18*c* compares the map acquired at S202 with the surrounding environment information acquired at S102 in FIG. 4 to specify an absolute position of the leaning vehicle 10. For example, the specifying section 18*c* can specify an absolute position of the leaning vehicle 10 by comparing a detection point indicating a lane boundary that is included in the map with a detection point indicating a lane boundary detected by the radar 14 in the leaning vehicle 10.

Next to S203, at S204, the executing section 18*d* of the information processing apparatus 18 executes driving support control based on the absolute position information that is information related to the absolute position specified at S203, and the processing returns to S202.

The driving support control is control of supporting the driving by the rider of the leaning vehicle 10, as mentioned above. The executing section 18*d* executes, for example, as driving support control, control based on the surrounding environment information that is detected by the radar 14. In the information processing system 1, as is described later, an absolute position of the leaning vehicle 10 is appropriately specified. Therefore, the appropriately specified absolute position information can be used for the driving support control, so that the driving support control can be appropriately executed.

For example, the executing section 18*d* may execute driving support control for improving the safety, such as Adaptive cruise control, based on at least one of information on a position of the leaning vehicle 10 in a lane width direction and information on a position of the leaning vehicle 10 in a lane front-and-rear direction. In Adaptive cruise control, for example, the speed of the leaning vehicle 10 is controlled based on information indicating the speed of the leaning vehicle 10 that is acquired based on a detection result by the front-wheel wheel speed sensor 16 and a detection result by the rear-wheel wheel speed sensor 17.

Moreover, for example, the executing section 18*d* may execute, in driving support control related to group traveling, determination of a vehicle train where the own vehicle is present, based on information on a position of the leaning vehicle 10 in the lane width direction. In the group traveling, a plurality of vehicles including the own vehicle travel in a plurality of vehicle trains (specifically, two vehicle trains of a vehicle train on the left side and a vehicle train on the right side in the same lane).

Moreover, for example, the executing section 18*d* may execute lane keeping assist as driving support control based on information on a position of the leaning vehicle 10 in the lane width direction. The lane keeping assist is a driving support operation that prevents the own vehicle from deviating from the traveling lane. Note that, the executing section 18*d* may prohibit the lane keeping assist when the leaning vehicle 10 approaches a curved road.

Moreover, for example, the executing section 18*d* may execute notification control of making a notification to a rider based on information on a position of the leaning vehicle 10 in the lane front-and-rear direction, as driving support control. For example, in the notification control, it is notified that the speed of the leaning vehicle 10 is expected to exceed the legal speed. Moreover, for example, in the notification control, it is notified that a road surface on which the leaning vehicle 10 is traveling or will travel in the future is a frozen road. Note that, under a situation where these pieces of notification control are performed, in addition to the notification control or in place of the notification control, the executing section 18*d* may execute control of automatically decelerating the leaning vehicle 10 as driving support control.

As mentioned above, as the situation where the driving support control is executed based on the absolute position information, for example, various kinds of situations including a situation where the leaning vehicle 10 is changing the lane are assumed. Note that, the situation where the driving support control is executed based on the absolute position information is not limited to the abovementioned examples, but for example, the executing section 18*d* may execute the driving support control based on the absolute position information in the situation where the leaning vehicle 10 performs slip-through traveling (what is called, Lane splitting).

Note that, the driving support control may be executed based on, in addition to the absolute position information, information other than the absolute position information. For example, the executing section 18*d* may execute the driving support control based on, in addition to the absolute position information, information (for example, traveling state information, map information, or reliability information, which is described later) already acquired during when the absolute position is specified.

As has been described in the foregoing, in the information processing system 1, the acquiring section 18*b* acquires surrounding environment information on the leaning vehicle 10 based on an output from the radar 14 mounted to the leaning vehicle 10, and the specifying section 18*c* specifies an absolute position of the leaning vehicle 10 based on the surrounding environment information. Specifically, the communicating section 18*a* transmits surrounding environment information to the server 20 that is an external apparatus, and the specifying section 18*c* specifies an absolute position based on a map that is created or updated based on the surrounding environment information transmitted to the server 20. Herein, in the processing that is performed by the information processing apparatus 18, the radar 14 is used to implement acquiring the surrounding environment information on the leaning vehicle 10 with high accuracy. Therefore, the surrounding environment information that is appropriately acquired based on the output from the radar 14 is used to specify an absolute position of the leaning vehicle 10. Therefore, an absolute position of the leaning vehicle 10 can be appropriately specified.

In the above, with reference to FIGS. 4 and 5, the examples of the processing related to creating a map, and the processing related to using the map have been described. Further, the processing that is performed by the information processing system 1 may be processing other than the above-described processing.

For example, the communicating section 18*a* may transmit absolute position information that is information related to an absolute position of the leaning vehicle 10, to an external apparatus. The communicating section 18*a* transmits the absolute position information to vehicles in the surrounding, for example. Accordingly, in a vehicle in the surrounding, the absolute position of the leaning vehicle 10 can be displayed on a display apparatus, and the absolute position of the leaning vehicle 10 can be informed to a driver of the vehicle in the surrounding.

Moreover, for example, the specifying section 18*c* may specify an absolute position of the leaning vehicle 10 without using a map that is created or updated by the server 20. The specifying section 18*c* directly uses surrounding environment information that is acquired based on the output from the radar 14 to specify an absolute position of the leaning vehicle 10, for example. Accordingly, without using the communication between the information processing apparatus 18 and the server 20, an absolute position of the leaning vehicle 10 can be specified.

In the above, with reference to FIG. 4, the processing example related to creating a map has been described. Herein, from the viewpoint of more appropriately specifying an absolute position of the leaning vehicle 10, the information processing system 1 preferably performs the processing related to creating a map by considering reliability information that is information on the reliability for the surrounding environment information. Hereinafter, as an example of processing related to creating a map in which reliability information is considered, first processing and second processing will be described sequentially.

FIG. 6 is a flowchart illustrating one example of a flow of the first processing that is related to creating a map in which reliability information is considered, and is performed by the information processing system 1. S301 in FIG. 6 corresponds to a start of a processing flow illustrated in FIG. 6.

When the processing flow illustrated in FIG. 6 is started, at S302, the acquiring section 18*b* of the information processing apparatus 18 acquires surrounding environment information based on an output from the radar 14. The processing at S302 is similar to the processing at S102 in FIG. 4.

Next to S302, at S303, the acquiring section 18*b* of the information processing apparatus 18 acquires reliability information that is information on reliability for surrounding environment information.

Herein, a posture easily changes in the leaning vehicle 10, in comparison with a four-wheeled automobile and the like. Further, in a situation where the posture of the leaning vehicle 10 easily changes, due to the posture of the leaning vehicle 10 becoming a posture different from a reference posture (for example, a posture in which the leaning vehicle 10 stands upright) or the like, the reliability for surrounding environment information to be detected by the radar 14 that is mounted to the leaning vehicle 10 becomes low. The map that is managed by the server 20 includes, in addition to surrounding environment information that is acquired by the leaning vehicle 10, surrounding environment information that is acquired by a four-wheeled automobile and the like. Therefore, it is important to maintain the reliability for the surrounding environment information that is acquired by the leaning vehicle 10 and is used for the map creating processing to the level similar to that of the reliability for the surrounding environment information that is acquired by the four-wheeled automobile and the like.

The reliability information is information for determining whether the reliability for the acquired surrounding environment information is lower than a reference. A case where the reliability for the acquired surrounding environment information is lower than the reference corresponds to a case where the reliability for the surrounding environment information that is acquired by the leaning vehicle 10 does not reach to the level similar to that of the reliability for the surrounding environment information that is acquired by the four-wheeled automobile and the like. On the other hand, a case where the reliability for the acquired surrounding environment information is equal to or higher than the reference corresponds to a case where the reliability for the surrounding environment information that is acquired by the leaning vehicle 10 reaches to the level similar to that of the reliability for the surrounding environment information that is acquired by the four-wheeled automobile and the like.

For example, the acquiring section 18*b* may acquire reliability information based on traveling state information that is information related to a traveling state of the leaning vehicle 10. The traveling state information includes a lean angle, the degree of change in the lean angle, a pitch angle, the degree of change in the pitch angle, a yaw angle, the degree of change in the yaw angle (in other words, yaw rate), a steering angle of a handle, the degree of change in the steering angle of the handle, the speed of the leaning vehicle 10, the acceleration of the leaning vehicle 10, and the like.

For example, in a case where the lean angle of the leaning vehicle 10 is excessively large, the acquiring section 18*b* acquires information indicating that the reliability for the acquired surrounding environment information is lower than the reference, as reliability information. In a case where the lean angle is excessively large, it is assumed that the leaning vehicle 10 performs curve traveling. In a case where the leaning vehicle 10 performs the curve traveling, the posture of the leaning vehicle 10 easily changes. Therefore, it can be determined that the reliability for the acquired surrounding environment information is lower than the reference.

Moreover, for example, in a case where the speed of the leaning vehicle 10 is excessively low or excessively high, the acquiring section 18*b* acquires information indicating that the reliability for the acquired surrounding environment information is lower than the reference, as reliability information. In a case where the speed of the leaning vehicle 10 is excessively low, in order to balance the leaning vehicle 10, a rider performs an operation of swinging the handle little by little from side to side. Accordingly, the radar 14 is swung from side to side in synchronization with the handle, so that the direction of the radar 14 easily varies. Therefore, it can be determined that the reliability for the acquired surrounding environment information is lower than the reference. In a case where the speed of the leaning vehicle 10 is excessively high, it is assumed that the posture of the leaning vehicle 10 becomes unstable and easily changes. Therefore, it can be determined that the reliability for the acquired surrounding environment information is lower than the reference.

Moreover, for example, the acquiring section 18*b* may acquire reliability information based on map information. The map information is stored in the storing section 23 of the server 20, for example, and is transmitted from the server 20. Note that, the map information may be acquired from an apparatus other than the server 20.

For example, in a case where it has been determined that the leaning vehicle 10 is traveling on a curved road based on the map information, the acquiring section 18*b* acquires information indicating that the reliability for the acquired surrounding environment information is lower than the reference, as reliability information. As mentioned above, in a case where the leaning vehicle 10 performs the curve traveling, the posture of the leaning vehicle 10 easily varies. Therefore, it can be determined that the reliability for the acquired surrounding environment information is lower than the reference.

Next to S303, at S304, the communicating section 18*a* of the information processing apparatus 18 transmits surrounding environment information and reliability information to the server 20 that is an external apparatus. The communicating section 21 of the server 20 receives the transmitted surrounding environment information and reliability information.

Next to S304, at S305, the creating section 22 of the server 20 determines whether the reliability information is information indicating that the reliability for the acquired surrounding environment information is lower than the reference.

At S305, if it has been determined that the reliability information is not information indicating that the reliability for the acquired surrounding environment information is lower than the reference (S305/NO), the processing proceeds to S306. At S306, the creating section 22 executes the map creating processing based on the surrounding environment information, and the processing returns to S302. The processing at S306 is similar to the processing at S104 in FIG. 4.

On the other hand, at S305, if it has been determined that the reliability information is information indicating that the reliability for the acquired surrounding environment information is lower than the reference (S305/YES), S306 is not performed and the processing returns to S302.

In the first processing described above, the creating section 22 executes the map creating processing based on the reliability information that is information on the reliability for the surrounding environment information. Further, the specifying section 18*c* specifies an absolute position of the leaning vehicle 10 based on the map created or updated based on the reliability information. Therefore, the specifying section 18*c* specifies an absolute position of the leaning vehicle 10 based on the reliability information that is information on the reliability for the surrounding environment information. Accordingly, an absolute position of the leaning vehicle 10 can be specified by considering the reliability for the surrounding environment information, so that the absolute position of the leaning vehicle 10 can be more appropriately specified.

In particular, in the first processing, in a case where the reliability information is information indicating that the reliability for the acquired surrounding environment information is lower than the reference, the creating section 22 does not execute the map creating processing. Accordingly, it is possible to prevent surrounding environment information with low reliability from being used in the map creating processing. Therefore, an absolute position of the leaning vehicle 10 can be specified using the map with high accuracy, so that more appropriately specifying the absolute position of the leaning vehicle 10 is appropriately implemented.

In the processing described with reference to FIG. 6 in the above, the server 20 determines whether the execution of the map creating processing is possible based on the reliability information. Further, in a case where the reliability information is information indicating that the reliability for the acquired surrounding environment information is lower than the reference, the communicating section 18*a* of the information processing apparatus 18 does not need to transmit the surrounding environment information to the server 20. In this case as well, as a result, the map creating processing is not executed.

Note that, in a case where the reliability information is information indicating that the reliability for the acquired surrounding environment information is lower than the reference, the creating section 22 may execute the map creating processing not based on the acquired surrounding environment information. For example, in such a case, the creating section 22 does not use the surrounding environment information acquired by the leaning vehicle 10, but may execute the map creating processing based on surrounding environment information acquired by a vehicle other than the leaning vehicle 10.

Note that, in a case where the map creating processing is executed even in a case where the reliability information is information indicating that the reliability for the acquired surrounding environment information is lower than the reference, the executing section 18*d* may execute the driving support control not based on the absolute position information.

FIG. 7 is a flowchart illustrating one example of a flow of second processing that is related to creating a map in which reliability information is considered, and is performed by the information processing system 1. S401 in FIG. 7 corresponds to a start of a processing flow illustrated in FIG. 7.

When the processing flow illustrated in FIG. 7 is started, at S402, the acquiring section 18*b* of the information processing apparatus 18 acquires surrounding environment information based on an output from the radar 14. The processing at S402 is similar to the processing at S102 in FIG. 4.

Next to S402, at S403, the acquiring section 18*b* of the information processing apparatus 18 acquires reliability information that is information on reliability for surrounding environment information. The processing at S403 is similar to the processing at S303 in FIG. 6.

Next to S403, at S404, the acquiring section 18*b* of the information processing apparatus 18 determines whether the reliability information is information indicating that the reliability for the acquired surrounding environment information is lower than the reference.

At S404, if it has been determined that the reliability information is information indicating that the reliability for the acquired surrounding environment information is lower than the reference (S404/YES), the processing proceeds to S405. At S405, the acquiring section 18*b* of the information processing apparatus 18 acquires corrected surrounding environment information that is information obtained by correcting the acquired surrounding environment information, and the processing proceeds to S406.

At S405, the acquiring section 18*b* acquires the corrected surrounding environment information, for example, by replacing the surrounding environment information acquired at S402 with surrounding environment information having been determined that the reliability is equal to or more than the reference, among the surrounding environment information acquired in the past. For example, if it has been determined as YES at S404 due to the excessive large lean angle of the leaning vehicle 10, the acquiring section 18*b* acquires the corrected surrounding environment information by replacing surrounding environment information acquired at S402 with surrounding environment information acquired in the past in a situation of the small lean angle of the leaning vehicle 10.

On the other hand, at S404, if it has been determined that the reliability information is not information indicating that the reliability for the acquired surrounding environment information is lower than the reference (S404/NO), S405 is not performed and the processing proceeds to S406.

Next to S405 or if it has been determined as NO at S404, at S406, the communicating section 18*a* of the information processing apparatus 18 transmits the surrounding environment information or the corrected surrounding environment information to the server 20 that is an external apparatus. If no S405 is performed, the communicating section 18*a* transmits the surrounding environment information acquired at S402 to the server 20. On the other hand, if S405 has been performed, the communicating section 18*a* transmits the corrected surrounding environment information acquired at S405 to the server 20. The communicating section 21 of the server 20 receives the transmitted surrounding environment information or corrected surrounding environment information.

Next to S406, at S407, the creating section 22 executes the map creating processing based on the surrounding environment information or the corrected surrounding environment information, and the processing returns to S402. The processing at S407 is similar to the processing at S104 in FIG. 4.

In the second processing described above, similar to the first processing, the creating section 22 executes the map creating processing based on the reliability information that is information on the reliability for the surrounding environment information. Further, the specifying section 18*c* specifies an absolute position of the leaning vehicle 10 based on the map created or updated based on the reliability information. Therefore, the specifying section 18*c* specifies an absolute position of the leaning vehicle 10 based on the reliability information that is information on the reliability for the surrounding environment information. Accordingly, an absolute position of the leaning vehicle 10 can be specified by considering the reliability for the surrounding environment information, so that the absolute position of the leaning vehicle 10 can be more appropriately specified.

In particular, in the second processing, in a case where the reliability information is information indicating that the reliability for the acquired surrounding environment information is lower than the reference, the acquiring section 18*b* acquires corrected surrounding environment information that is information obtained by correcting the acquired surrounding environment information. Accordingly, it is possible to prevent surrounding environment information with low reliability from being used in the map creating processing. Therefore, an absolute position of the leaning vehicle 10 can be specified using the map with high accuracy, so that more appropriately specifying the absolute position of the leaning vehicle 10 is appropriately implemented.

In the above, with reference to FIGS. 4 to 7, the processing that is performed by the information processing system 1 has been described by distinguishing the processing to be performed by the information processing apparatus 18 from the processing to be performed by the server 20. Further, a part or all of the processing that is performed by the information processing apparatus 18 in the abovementioned example may be performed by the server 20, and a part or all of the processing that is performed by the server 20 in the abovementioned example may be performed by the information processing apparatus 18.

Effects of Information Processing System

Effects of the information processing system 1 according to the embodiment of the invention will be described.

In the information processing system 1, the acquiring section 18*b* acquires surrounding environment information on the leaning vehicle 10 based on an output from the radar 14 mounted to the leaning vehicle 10, and the specifying section 18*c* specifies an absolute position of the leaning vehicle 10 based on the surrounding environment information. Therefore, the surrounding environment information that is appropriately acquired based on the output from the radar 14 is used to specify an absolute position of the leaning vehicle 10. Therefore, the absolute position of the leaning vehicle 10 can be appropriately specified. For example, in a case where an absolute position of the leaning vehicle 10 is specified by only using GPS, an error occurs, and an absolute position of the leaning vehicle 10 cannot be accurately specified in some cases. With the disclosure, instead of or in combination with an absolute position of the leaning vehicle 10 specified by GPS, employing an absolute position of the leaning vehicle 10 specified based on the surrounding environment information allows the absolute position of the leaning vehicle 10 to be determined with high accuracy.

Preferably, in the information processing system 1, the specifying section 18*c* specifies an absolute position of the leaning vehicle 10 based on reliability information that is information on the reliability for the surrounding environment information. Accordingly, an absolute position of the leaning vehicle 10 can be specified by considering the reliability for the surrounding environment information, so that the absolute position of the leaning vehicle 10 can be more appropriately specified.

Preferably, in the information processing system 1, the acquiring section 18*b* acquires reliability information based on traveling state information that is information related to a traveling state of the leaning vehicle 10. Accordingly, the reliability information can be appropriately acquired using the traveling state information. Therefore, whether the reliability for the acquired surrounding environment information is lower than the reference can be appropriately determined.

Preferably, in the information processing system 1, the acquiring section 18*b* acquires reliability information based on map information. Accordingly, the reliability information can be appropriately acquired using the map information. Therefore, whether the reliability for the acquired surrounding environment information is lower than the reference can be appropriately determined.

Preferably, in the information processing system 1, the communicating section 18*a* transmits surrounding environment information to the external apparatus (the server 20 in the abovementioned example), and the specifying section 18*c* specifies an absolute position based on a map that is created or updated based on the surrounding environment information transmitted to the external apparatus. Accordingly, specifying an absolute position of the leaning vehicle 10 using the surrounding environment information that is appropriately acquired based on the output from the radar 14 is appropriately implemented. Therefore, appropriately specifying the absolute position of the leaning vehicle 10 is appropriately implemented.

Preferably, in the information processing system 1, the communicating section 18*a* transmits absolute position information that is information related to an absolute position of the leaning vehicle 10, to an external apparatus. Accordingly, the external apparatus can perform various kinds of processing using the absolute position information. For example, in a vehicle in the surrounding, the absolute position of the leaning vehicle 10 can be displayed on a display apparatus, and the absolute position of the leaning vehicle 10 can be informed to a driver of the vehicle in the surrounding.

Preferably, in the information processing system 1, the executing section 18*d* executes the driving support control that supports the driving by the rider of the leaning vehicle 10 based on the absolute position information that is information related to an absolute position of the leaning vehicle 10. Accordingly, the appropriately specified absolute position information can be used for the driving support control, so that the driving support control can be appropriately executed.

Moreover, in the information processing system 1, the acquiring section 18*b* acquires surrounding environment information that is information related to an environment in the surrounding of the leaning vehicle 10 based on the output from the radar 14 mounted to the leaning vehicle 10, the creating section 22 executes the map creating processing of creating or updating a map based on the surrounding environment information, and the specifying section 18*c* specifies an absolute position of the leaning vehicle 10 based on the map. Accordingly, the surrounding environment information that is appropriately acquired based on the output from the radar 14 is used to create or update a map. Further, such a map is used to specify an absolute position of the leaning vehicle 10. Therefore, the absolute position of the leaning vehicle 10 can be appropriately specified. For example, in a case where an absolute position of the leaning vehicle 10 is specified by only using GPS, an error occurs, and an absolute position of the leaning vehicle 10 cannot be accurately specified in some cases. With the disclosure, instead of or in combination with an absolute position of the leaning vehicle 10 specified by GPS, employing an absolute position of the leaning vehicle 10 specified with the map allows the absolute position of the leaning vehicle 10 to be determined with high accuracy.

Preferably, in the information processing system 1, in case where the reliability information is information indicating that the reliability for the acquired surrounding environment information is lower than the reference, the creating section 22 does not execute the map creating processing. Accordingly, it is possible to prevent surrounding environment information with low reliability from being used in the map creating processing. Therefore, an absolute position of the leaning vehicle 10 can be specified using the map with high accuracy, so that more appropriately specifying the absolute position of the leaning vehicle 10 is appropriately implemented.

Preferably, in the information processing system 1, in a case where the reliability information is information indicating that the reliability for the acquired surrounding environment information is lower than the reference, the acquiring section 18*b* acquires corrected surrounding environment information that is information obtained by correcting the acquired surrounding environment information. Accordingly, it is possible to prevent surrounding environment information with low reliability from being used in the map creating processing. Therefore, an absolute position of the leaning vehicle 10 can be specified using the map with high accuracy, so that more appropriately specifying the absolute position of the leaning vehicle 10 is appropriately implemented.

Preferably, in the information processing system 1, in a case where the reliability information is information indicating that the reliability for the acquired surrounding environment information is lower than the reference, the creating section 22 executes the map creating processing not based on the acquired surrounding environment information. Accordingly, the surrounding environment information acquired by the leaning vehicle 10 is not used, but a map can be created or updated based on surrounding environment information acquired by a vehicle other than the leaning vehicle 10.

The invention is not limited the description of the embodiment. For example, only a part of the embodiment may be executed. For example, information to be used for acquiring reliability information in each processing of the first processing and the second processing related to creating a map by considering the reliability information described above is not specially limited. Specifically, in each processing of the first processing and the second processing described above, as information that is used for acquiring reliability information, traveling state information may be used, or map information may be used. Moreover, in each processing of the first processing and the second processing described above, as information that is used for acquiring reliability information, both of the traveling state information and the map information may be used.

REFERENCE SIGNS LIST

1: Information processing system
10: Leaning vehicle
11: Engine
12: Hydraulic pressure control unit
13: Display apparatus
14: Radar
15: Inertial measurement apparatus
16: Front-wheel wheel speed sensor
17: Rear-wheel wheel speed sensor
18: Information processing apparatus

18*a*: Communicating section
18*b*: Acquiring section
18*c*: Specifying section
18*d*: Executing section
20: Server
21: Communicating section
22: Creating section
23: Storing section
N1: Communication network

The invention claimed is:

1. An information processing apparatus (18) that performs information processing related to a position of a leaning vehicle (10), the information processing apparatus comprising a computer configured to:

acquire surrounding environment information that is information related to an environment in a surrounding of the leaning vehicle (10) based on an output from a radar (14) mounted to the leaning vehicle (10); and specify an absolute position of the leaning vehicle (10) based on the surrounding environment information and reliability information that is information on reliability of the surrounding environment information.

2. The information processing apparatus according to claim 1, wherein the computer acquires the reliability information based on traveling state information that is information related to a traveling state of the leaning vehicle (10).

3. The information processing apparatus according to claim 1, wherein the computer acquires the reliability information based on map information.

4. The information processing apparatus according to claim 1, wherein the computer is further configured to execute driving support control to support driving by a rider of the leaning vehicle (10) based on absolute position information that is information related to the absolute position.

5. The information processing apparatus of claim 1, wherein the reliability information indicates reduced reliability of the surrounding environment information when the computer determines, based on map information, that leaning vehicle (10) is traveling on a curved road.

6. The information processing apparatus of claim 1, wherein the reliability information indicates reduced reliability of the surrounding environment information when the computer determines that a posture of the leaning vehicle (10) deviates from a reference posture.

7. The information processing apparatus according to claim 1, wherein the computer is further configured to transmit the surrounding environment information to an external apparatus (20), wherein the computer specifies the absolute position based on a map created or updated based on the surrounding environment information transmitted to the external apparatus (20).

8. The information processing apparatus according to claim 7, wherein the computer is further configured to transmit absolute position information that is information related to the absolute position to the external apparatus (20).

9. An information processing system (1) that performs information processing related to a position of a leaning vehicle (10), the information processing system comprising a computer configured to:

acquire surrounding environment information that is information related to an environment in a surrounding of the leaning vehicle (10) based on an output from a radar (14) mounted to the leaning vehicle (10);

acquire reliability information of the surrounding environment information based on traveling state information that is information related to a traveling state of the leaning vehicle (10);

execute map creating processing of creating or updating a map based on the surrounding environment information; and specify an absolute position of the leaning vehicle (10) based on the map and the reliability information that is information on reliability of the surrounding environment information.

10. The information processing system according to claim 9, wherein computer specifies the absolute position based on reliability information that is information on reliability for the surrounding environment information.

11. The information processing system according to claim 10, wherein the computer does not execute the map creating processing when the reliability information is information indicating that the reliability for the acquired surrounding environment information is lower than a reference.

12. The information processing system according to claim 10, wherein the computer acquires corrected surrounding environment information that is information obtained by correcting the acquired surrounding environment information, when the reliability information is information indicating that the reliability for the acquired surrounding environment information is lower than a reference.

13. The information processing system according to claim 10, wherein the computer executes the map creating processing not based on the acquired surrounding environment information, when the reliability information is information indicating that the reliability for the acquired surrounding environment information is lower than a reference.

14. The information processing system according to claim 9, further comprising an executing section (18*d*) that executes driving support control to support driving by a rider of the leaning vehicle (10) based on absolute position information that is information related to the absolute position.

15. An information processing method of performing information processing related to a position of a leaning vehicle (10), the information processing method comprising:

acquiring, via a computer, surrounding environment information that is information related to an environment in a surrounding of the leaning vehicle (10) based on an output from a radar (14) mounted to the leaning vehicle (10);

acquiring reliability information of the surrounding environment information based on traveling state information that is information related to a traveling state of the leaning vehicle (10); and specifying, via the computer, an absolute position of the leaning vehicle (10) based on the surrounding environment information and the reliability information that is information on reliability of the surrounding environment information.

16. The information processing apparatus according to claim 2, wherein the information relating to the traveling state of the leaning vehicle (10) includes at least one from a group consisting of a lean angle, a degree of change in the lean angle, a pitch angle, a degree of change in the pitch angle, a yaw angle, a degree of change in the yaw angle, a steering angle of a handle, a degree of change in the steering angle of the handle, a speed, and an acceleration of the leaning vehicle (10).

* * * * *